Sept. 9, 1941.   R. L. LINCOLN   2,255,292
AIR CONDITIONING SYSTEM
Filed March 30, 1939   2 Sheets-Sheet 2

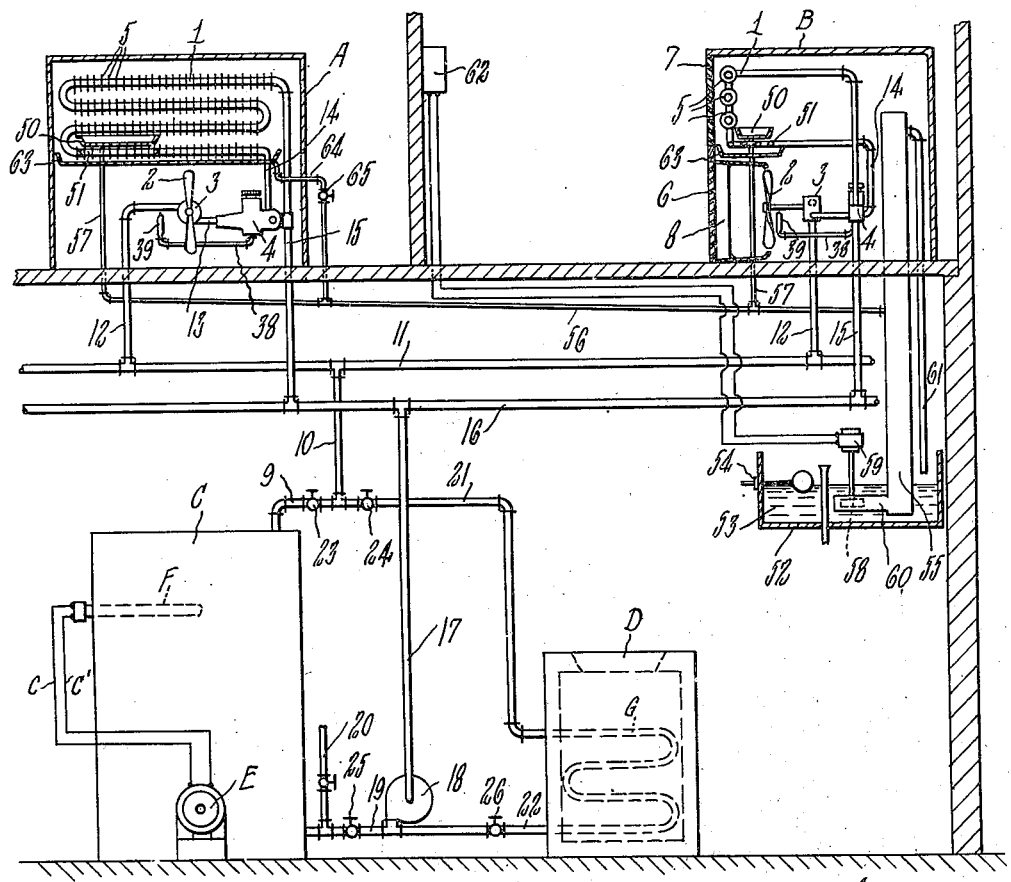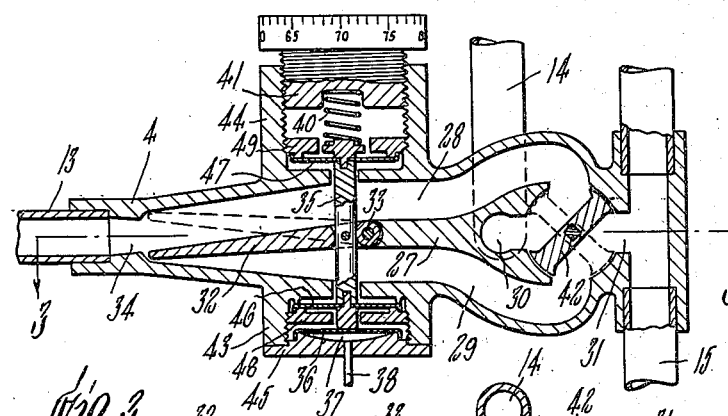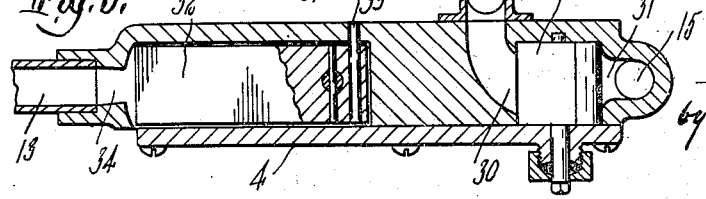

Inventor
Roland L. Lincoln
by Wright, Brown, Quinby & Way
Attys.

Patented Sept. 9, 1941

2,255,292

UNITED STATES PATENT OFFICE 2,255,292

AIR CONDITIONING SYSTEM

Roland L. Lincoln, Middlebury, Conn., assignor to Hoffman Specialty Company, Waterbury, Conn., a corporation of Illinois Application March 30, 1939, Serial No. 264,919

19 Claims. (Cl. 257—3)

The subject matter of the present invention is a system for conditioning air, by which I mean regulating the temperature and content of water vapor of the air within rooms and other enclosed spaces designed for human occupancy. Thus, as used in this specification, "conditioning" means heating, humidifying, cooling or dehumidifying according as atmospheric conditions require modification in the temperature and/or vapor content of the air to enhance the comfort of the occupants.

Among the objects of the invention are (1) that of controlling the temperature and humidity of a number of different rooms or apartments separately and individually where there is a single source of heating or cooling effect for all of such rooms; (2) to provide a single conditioning system with means for either heating or cooling the rooms as necessitated by external atmospheric conditions and at the same time, if desired, humidifying the air; (3) to circulate the air in the several rooms or apartments and control the heating or cooling effect in each, independently of the others, by the local temperature; and (4) to cause circulation of the air in the room by energy supplied by the fluid used for heating or cooling purposes.

The invention comprises an air conditioning system having means for accomplishing any or all of the foregoing objects. An embodiment of the invention and some of the possible modifications and variations of some of the features or elements thereof are explained in the following specification with illustrations by diagrammatic drawings.

In these drawings—

Fig. 1 is a diagram showing two conditioning units in separate apartments connected with a central source of heating and cooling effects;

Fig. 2 is a detail sectional view of a control valve used in each unit for regulating the temperature of the air in the room without affecting the rate of impelled circulation of air therein;

Fig. 3 is a sectional view of the control valve taken on line 3—3 of Fig. 2;

Like reference characters designate the same parts wherever they occur in all the figures.

Figure 4:
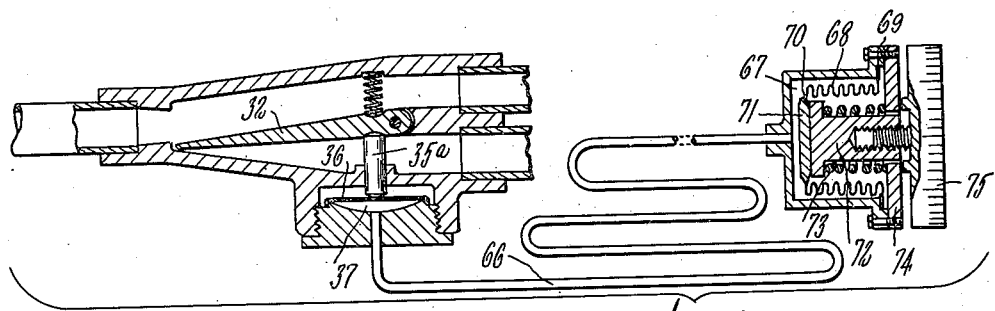
Fig. 4 is a view similar to Fig. 2 showing a variation in the temperature controlled operating means for such valve.

This system is applicable for conditioning the air of rooms in dwelling houses, hotels, public buildings, offices, etc.; in short, in all situations where there is need of heating or cooling, circulating, and regulating the vapor content of the air of rooms, etc. intended for human occupancy. The drawings illustrating the invention are designed to show its principles so that all persons skilled in the art to which it pertains may put it into effect, using standard equipment which is available in the market. The novelty of the invention resides mainly in certain combinations of elements which individually are old and well known. However, it includes a new control valve, the principles of which are shown in detail in the drawings.

In its fundamentals, the invention comprises a heat interchanger by which the temperature of a circulating fluid may be altered, a radiator in the apartment of which the air is to be conditioned, in fluid circulating connection with the heat interchanger, a fan or blower for causing a flow of air in the room past and in contact with such radiator, and a fluid motor driven by the circulating fluid connected to actuate the fan or blower. The invention further comprises the combination with these fundamentals of a valve interposed between such fluid motor and the radiator having a by-pass connection with the circulating system, which may be controlled by the temperature of the air in the room, for causing more or less of the circulating fluid to pass through the radiator without affecting the speed of the fan. The invention further includes provisions for humidifying the air in the apartment and for discharging water condensed from the vapor content of such air. The heat interchanger above referred to may be one adapted to deliver heat into the circulating fluid or one which withdraws heat therefrom; in other words, a heater or a cooler. And the invention further comprises means by which the same system may be utilized for either heating or cooling purposes.

The diagram in Fig. 1 shows two air conditioning units A and B in different rooms or apartments of a building and connections for circulating fluid between such units and heat interchangers C and D in the basement of the building. The heat interchanger C may be a hot water heater having an oil burner E, such as commonly used for house heating; and it typifies any heater or boiler whether heated by oil, gas or solid fuel. It may be of any type or character now known or which may be hereafter developed. It is equipped with a thermostatic regulator F, of known character, which operates within high and low temperature limits and stops or starts the oil or gas burner, or operates the dampers in a coal fired system through controlling means diagrammatically represented here by the electrical conductors c and c'.

The heat interchanger D is a cooling element or refrigerator through which a coil G passes, and typifies any refrigerator or cooler whether the cooling effect is produced by ice, mechanical refrigeration, or other means.

The conditioning units are essentially alike, and each comprises a radiator 1, a circulating fan or blower 2, a fluid motor 3 for operating the fan and a control valve 4. The radiator may be a coil of pipes as shown here, equipped with fins 5 for greater heat conducting effect, or of any other suitable character. The fan or blower and fluid motor may be of any presently known or other suitable character for, respectively, inducing a flow of air and deriving motion from the impact or velocity or pressure of a liquid or vapor. Preferably the radiator and fan are enclosed in a casing having an air inlet 6 and outlet 7 disposed in any convenient arrangement so that a current of air induced by the fan will flow over the radiator and thence into the room. A filter 8 is preferably located across the inlet.

Pipes 9 and 10 lead from the heater C to a supply main 11, from which branch pipes 12 lead to the several air conditioning units. In each unit the supply pipe 12 leads to the intake of the fluid motor 3, from which the exhaust outlet is connected by a pipe 13 with the control valve 4. This valve has two outlets, one of which is connected by a pipe 14 with the intake of the radiator, while the other outlet is connected to the return pipe 15 which leads from the outlet of the radiator to the return main 16 of the system. A pipe 17 passes from the return main to the intake of a circulating pump 18, the outlet of which is connected by a pipe 19 with the heater. The pipe 20 represents a connection with a water supply for replenishing the water in the system.

The cooling coil G is connected by a pipe 21 with the connection 10 to the supply main, and by a pipe 22 with the discharge outlet of the circulating pump. Valves 23 and 24 in the pipe connections 9 and 21 respectively, and valves 25 and 26 in the connections 19 and 22 respectively may be opened and closed to cause circulation of the heat carrying fluid through either the heater or the cooler exclusively.

The circulating fluid, in passing to the radiator, drives the fluid motor 3 and thereby the fan. This motor and fan may be directly connected, as indicated here, or coupled by speed increasing or reducing gearing, according to well known principles, in order to drive the fan at an efficient speed, having regard to the pressure and velocity of the circulating fluid available for driving the motor. I have ascertained that various pressure differences between the supply and return sides of the system, ranging between 10 pounds and 50 pounds per square inch, suffice to drive the fan at suitable speed, depending on the type of motor used, the size of the fan employed, and the volume of air to be circulated. These factors vary so much in different installations, all within the scope of the invention, that it is not feasible to give exact specifications in regard to them; Neither do I wish to be limited to any specific values. It is sufficient to say that pressure differences in the order to those above mentioned are readily obtainable by the circulating pump 18 in connection with the thermal effect of the central heat interchanger.

It is desirable, and practically essential, to regulate and vary the heat output, or heat absorption, of the radiator without materially affecting the rate of air flow produced by the fan. This is accomplished by the control valve 4 under automatic regulation by the air temperature, or by an equivalent manually operated valve. Attention is directed to Figs. 2 and 3 for a showing in detail of the principles of a suitable automatic valve for the purpose. The interior of the valve is divided by a partition 27 into two passages 28 and 29, the former of which leads to the outlet 30 which (when the reversing gate, later described, is in the position shown) is connected to the radiator intake pipe 14 and the other leads to the outlet 31 which is connected to the radiator return pipe 15. A switch blade or shutter 32 is pivoted at 33 at the end of the partition and extends thence to the inlet 34, to which the pipe 13 from the motor is connected. This switch blade is movable from the position shown in full lines in Fig. 2, wherein it closes the passage 29 and connects the passage 28 with the inlet, to the dotted line position wherein it opens passage 29 to the inlet, closing off the passage 28, and may occupy intermediate positions in which both passages are partly open to the inlet in varying degrees. The blade is coupled to a transverse stem 35, one end of which bears on a diaphragm 36 (or an equivalent bellows) enclosing a chamber 37 which is coupled by a tube 38 with a bulb 39 containing a volatile fluid and located in the air stream in the conditioning unit. The opposite end of the stem is acted on in the opposite direction by a spring 40 reacting against an adjustable abutment plug 41. Expansion of the fluid in the bulb causes the switch blade to be shifted from the full line position to, or toward, the dotted line position against the resistance of the spring. Suitable adjustment of the abutment 41 enables the blade to be exactly positioned in accordance with the air temperature to deliver as much of the circulating fluid to the radiator as needed to maintain a given temperature in the room, while the balance of the circulating fluid is by-passed through the outlet 31 to the return line. Thus the supply of fluid to the radiator is regulated according to the temperature conditions without altering the total volume of flow through the motor.

When the system is used for heating, a rise of air temperature requires reduction in the supply of heating fluid to the radiator. But when used for cooling the air, the reverse effect is required. Hence the valve is provided with a reversing gate 42 which may be rotated through an angle of 90° from the position here shown in full lines to the dotted line position so as to connect the passage 28 with the outlet 31 and the passage 29 with the outlet 30.

The valve casing is provided with oppositely extending internally threaded necks 43 and 44 coaxial with the stem 35, in the former of which is mounted a head 45 carrying the diaphragm 36 and containing the chamber 37, and in the other of which is mounted the abutment 41. Leakage of the circulating fluid past the stem is prevented by diaphragms 46 and 47 sealed fluid tight at their centers to the stem and at their circumferences to washers 48 and 49, respectively, which are mounted leakage tight within the necks 43 and 44. The stem may be made in a number of parts connected together in alinement as here shown to permit of the washers being screwed into the neck; but any other suitable construction may be adopted to effect tight seating of the washers without jeopardizing the integrity of the diaphragms or the sealed connections between diaphragms, washers and stem.

If manual control of the fluid is desired instead of the automatic control above described, a manually operated three-way valve may be substituted for the valve 4.

Provision is also made for humidifying the air when the system is used for heating. Fig. 1 shows a shallow evaporating pan 50 in each unit. To hasten evaporation, an auxiliary heating coil 51, connected with the radiator, is located beneath this pan. Various means may be provided to supply the pans with water, and I have here shown a single control means by which all units of the same level, as on the same floor of a building, may be thus supplied. A tank 52 contains water 53 up to a level regulated by a float controlled supply valve 54. A standpipe 55 rises from the tank to a level above that of the pans 50 and is connected with the pans in the various units by a main 56 and branch pipes 57. A pump 58 in the tank, operated by an electric motor 59, delivers water to the intake 60 of the standpipe. An overflow pipe 61 connected to the standpipe at a level between that of the pan bottoms and rims limits the height to which water will rise in the pans and prevents the latter from overflowing when the supply of water by the pump is greater than the quantity evaporated. The pump is controlled by a humidity responsive element 62, of known character, which operates through known means to close the operating circuit of the pump motor when the relative humidity of the air is below a prescribed degree, and open the circuit when the humidity rises above the prescribed limit. The humidity responsive element may be located at any desired point in the building. When the pump is stopped, the water in all the evaporating pans and in the standpipe subsides into the tank 52, which is made large enough to hold it.

When the system is used for cooling purposes in hot weather, water will frequently condense on the radiators. The same evaporating pans 50 may, if suitable in dimensions and location, collect the condensate dripping from the radiators. But separate collecting pans 63 may be provided for this purpose. The drains 64 from the collecting pans may lead to any delivery point, or may be connected with the pipe 56, and be provided with valves 65 to prevent flooding of the collection pans when the evaporating pans are filled.

Figure 5:
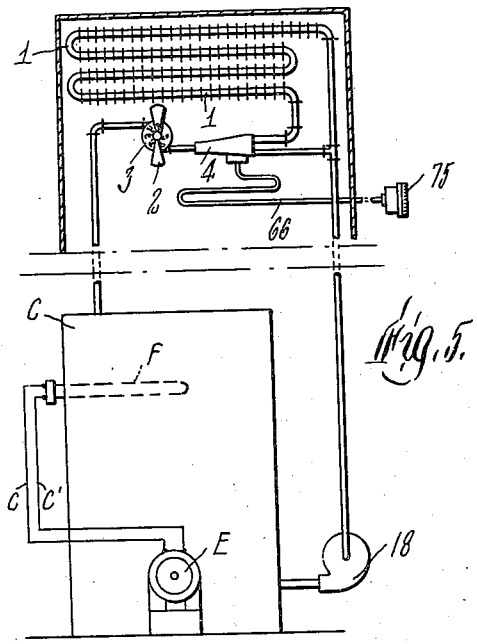
Fig. 5 is a diagram showing the manner in which the controller of Fig. 4 may be installed.

An equivalent modification of temperature governing means for the control valve 4 is shown in Figs. 4 and 5. Here instead of a bulb, as 39, containing volatile fluid, a line or coil 66 of tubing completely filled with a fluid is used. One end of the tube is connected to the diaphragm chamber 37 of the valve and the other end is connected to a chamber 67 containing a resilient bellows 68 sealed fluid tight at its rim 69 to the casing of the chamber and at its opposite end 70 to a disk 71 against which a stem 72 is pressed by a spring 73. The stem is movable freely through a head or end wall 74 of the chamber 67, and the spring reacts against said end wall.

A head 75 adjustably screw threaded into the stem bears on the outer side of the head 74 and serves to adjust the tension of the spring. Expansion or contraction of the fluid in the tube 66 and in the space surrounding the bellows in chamber 67, as influenced by temperature changes, reacts on the adjusted bellows and diaphragm 36, causing the switch blade 32 of the valve to be shifted in one direction or the other through stem 35a and spring 76.

The tube 66 is shown in Fig. 5 as being located in the casing of the conditioning unit, where it is exposed to the air entering the unit. But this location is not essential, and the control head with its bellows may be located at any convenient point in the room and the line of tubing may be led to it by any convenient route, where it may be affected by the air temperature in the room. The fluid filling this temperature responsive system may be any liquid having a high coefficient of expansion. Turpentine is one of many suitable liquids. The tube and terminal chambers should be completely filled with the liquid and cleared of all air and other gases before sealing, in order to insure the most uniform and efficient action.

The adjusting element of this device has the advantage over the abutment 41 previously described in that it may be located at any point, and possibly for more convenient access. But the principle is the same in both instances. The adjustable abutment 41 or the stop 75 may be provided with a scale of degrees of temperature, as here shown, for cooperation with a stationary index to determine the setting for maintaining any given temperature, according to known principles, or the well known equivalent device of a pointer connected to the adjusting member to move over a stationary temperature scale may be used.

The bellows 68 represents the type of bellows which may be used in place of the diaphragm 36 in the control valve. Conversely, a diaphragm may be used in place of the bellows 68. Bellows and diaphragms are equivalents for the purposes of this invention, both being flexible elements of extended area adapted to be displaced by pressure application. Hence the terms "diaphragm" and "bellows" as used in this specification are to be construed generically unless the context requires a different construction.

Figure 7:
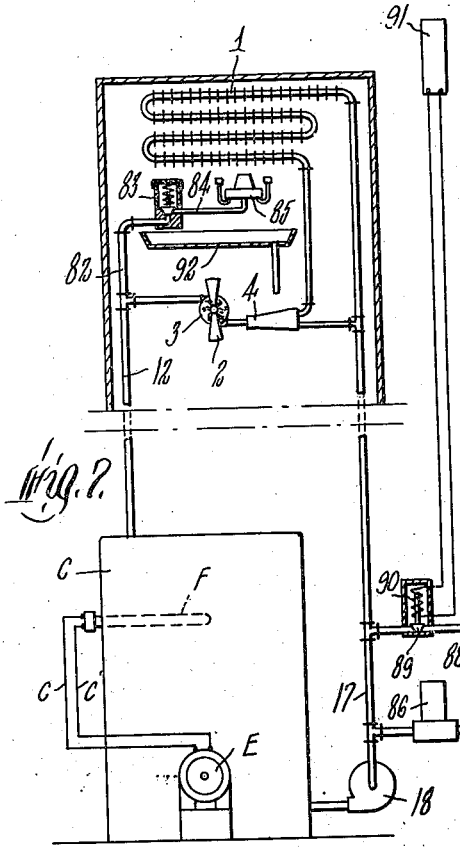
Fig. 7 is a diagrammatic view of a heating and humidifying system embodying the invention, in which heated water is used both for heating and for humidifying the air of the room.
Figure 6:
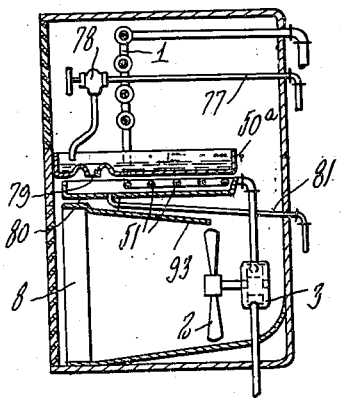
Fig. 6 is a diagrammatic sectional view of a form of air conditioning unit capable of use in the place of the unit shown in Fig. 1.

Fig. 6 shows a means alternative, and equivalent, to that shown in Fig. 1 for maintaining a supply of water for humidification purposes. Here the water is supplied to the evaporating pan 50a of any conditioning unit, independently of the supply to other units, by a pipe 77 provided with a valve 78 for regulating the delivery. The valve represented here is a manual valve adapted to be set so as to permit the water to drip into the pan at approximately the same rate as the rate of evaporation. But it typifies automatically controlled valves of any character, such as the float controlled valve 54 shown in Fig. 1 adapted to maintain the water level constantly at a given height, or a valve controlled by atmospheric humidity, such as that later described in connection with Fig. 7. Pan 50a has an overflow outlet 79 adapted to limit the depth of water when supplied without automatic regulation at a rate faster than the evaporation rate. This pan also is arranged to catch the drip from the radiator 1 when the room atmosphere is cooled and dehumidified in hot weather by circulating a cooling liquid through the radiator. Water passing from the outlet of the evaporation pan falls into a collecting pan 80 (which may be extended under the auxiliary heating coil 51 when such a coil is used), from which it is discharged by a drain pipe 81.

Where hot water is used as the circulating heating medium, a portion of the same water may be used for humidification. Fig. 7 shows an arrangement suitable for this purpose. A branch connection 82 from the radiator supply line leads to a spring loaded relief valve 83 from which a connection 84 passes to a spray head 85. A main pressure controlling (reducing) valve 86 is connected in the water supply line 87 which, in this installation, is connected to the return line 17 of the circulating system in advance of the circulating pump 18. A by-pass 88 leads from the supply line around the valve 86 to the return line 17 and contains a valve 89 connected with the core of a solenoid 90 in electrical connection with a humidity responsive element 91, of known character, which opens or closes the electric circuit of the solenoid when the relative humidity of the room atmosphere changes in relation to a setting of the instrument. The relief valve 83 is set or adjusted to a pressure somewhat below the service pressure in the supply pipe 87; and the control valve 86 is adjusted or set to reduce the pressure in the circulating system to a degree below that at which the valve 83 opens. Hence, when no demand exists for humidification, water circulates through the radiator I and the heater C in the manner previously described. But when humidification is required, the humidity responsive device 91 causes the valve 89 to be opened, whereupon the full pressure of the supply is imposed on the system, which opens the valve 83 and causes discharge of water from the spray head. A drain pan 92 is disposed to catch such part of the water delivered from the spray head as is not vaporized.

It will be obvious without special illustration that a solenoid-operated valve, such as the valve 89 or its equivalent, may be substituted for the spring loaded relief valve 83, and controlled directly by the humidity responsive element 89. And it is equally obvious that the drain pan 89 may be used as an evaporating pan supplied with water from the branch pipe 82 under control of a manually adjusted valve, a float operated valve, or a humidity controlled valve, as described in connection with Fig. 6.

In each of the installations and modifications herein described, the same combination of air circulating fan or blower and fluid motor for driving the fan is used, and the supply of fluid to the radiator controlled by the temperature of the room without affecting the volume and velocity of its flow through the motor. Although such a valve does not appear in Fig. 6, it is to be understood that such a valve is present, though concealed, and is connected with other parts of the system as previously described. Fig. 6, however, shows a suitable guide tube or funnel 93 for directing the flow of air from the inlet of the casing to the fan, which may be applied to the fans in the other units. Mechanical details of construction and arrangement of the several parts may be designed and modified in any manner desired by the designer of a specific installation without departure from the principles of this invention or from the protection herein claimed.

What I claim and desire to secure by Letters Patent is:

1. In air conditioning system, a heat interchanger and a radiator in fluid circulating connection with one another, a fan for causing flow of air in contact with the radiator, means for utilizing the circulating fluid to drive said fan, and controllable means for dividing the circulating fluid in its course to the radiator so that a selected fraction of the fluid passes through the radiator and the remainder is by-passed to the heat interchanger, without altering the amount of the fluid utilized for driving the fan.

2. An air conditioning apparatus comprising a heat interchanger, a radiator, a fluid motor, a blower coupled with said motor to be driven thereby and arranged to cause flow of air across the radiator in thermal contact therewith, a flow connection between the heat interchanger and radiator, a flow connection between the heat interchanger and the motor, a flow connection between the motor and radiator, and valve means in one of said connections adjustable to cause a fraction of the fluid circulating through the motor and heat interchanger to by-pass the radiator while the remainder of the fluid passes through the radiator.

3. An air conditioning system comprising a heat interchanger, a radiator and a fluid motor in series connection for circulation of a heat carrying fluid through them in a closed circuit, a blower operated by the motor arranged to cause flow of air in contact with the radiator, and valve means interposed in the circulating connections having means for causing a variable fraction of the fluid to by-pass the radiator while all of the fluid in circulation passes through the motor.

4. An air conditioning system comprising a heat interchanger, a radiator, a fluid motor in flow receiving connection with the heat interchanger, a blower operated by the motor arranged to cause flow of air in contact with the radiator, a valve having a plurality of internal passageways connected to receive fluid discharged from said motor, a flow connection between one of said passageways and the intake of the radiator, a return connection from the outlet of the radiator to the heat interchanger, and a by-passing connection from the second of the internal passages of the valve to said return connection, the valve having adjustables means for varying the relative flow capacities of said passageways.

5. An air conditioning system as set forth in claim 4, in which the valve includes a switch element shiftable to divert fluid entering from the motor exclusively to either of the internal passageways or partially to both in varying proportions.

6. An air conditioning system as set forth in claim 4, combined with thermally operated means for regulating the valve so as to direct the fluid entering the same exclusively to either passageway or partially to both in varying proportions according to the temperature of the air.

7. An air conditioning system comprising a radiator adapted to be located in a room of which the air is to be conditioned, a fan arranged to circulate the air in such room and cause passage of such air across the radiator in heat transferring relationship therewith, a fluid motor coupled with said fan for driving it, a heat interchanger coupled with the motor for delivering a circulating heat carrying fluid thereto, a valve coupled with the outlet of the motor for receiving said fluid therefrom, said valve having two outlets, a conduit leading from one of said outlets to the intake of the radiator, a return conduit from the outlet of the radiator to the heat interchanger, a connection from the second outlet of the valve to said return conduit, shiftable means in the valve for closing and opening said outlets in a manner to vary the proportions of fluid passing through the valve which are delivered to the radiator and to the return conduit respectively, and a heat responsive element located where it is affected by the temperature of the air being conditioned and coupled for shifting said flow regulating means in accordance with the temperature of the air.

8. An air conditioning system comprising a fluid heater, a fluid cooler, a radiator, flow and return connections between said radiator and both the heater and the cooler, a circulating pump in said connections, valves in the connections adapted to be opened and closed to cause circulation of fluid between the heater and radiator exclusively, or between the cooler and radiator exclusively, a fluid-operated motor in the flow connections leading from the heater and the cooler to the radiator, a valve interposed between said motor and the radiator having two outlets, one of which is connected to the intake of the radiator and the other to the return connection from the radiator, said valve including a shiftable internal switch element for causing all of the fluid delivered from the motor to pass exclusively to one of said outlets or the other, or partly to both in different proportions, and a blower coupled with said motor to be driven thereby and arranged to cause flow of air past the radiator in heat transferring contact therewith.

9. An air conditioning system as set forth in claim 8 combined with heat responsive means exposed in heat transferring contact with the air circulated by said fan and arranged to apply force to said switching means for shifting the latter in one direction or the other with rise and fall of the temperature of the air.

10. An air conditioning system comprising a radiator, an admission conduit leading to the inlet of the radiator, a return conduit leading from the outlet of the radiator, a valve having a single inlet, two outlets, of which one is connected to said admission conduit and the other to said return conduit, and a switching element movable to connect the inlet exclusively with either outlet or partially with both, a fluid motor having an intake and an outlet, of which the outlet is connected with the inlet of said valve, a fluid heater and a fluid cooler, both having delivery outlets in flow connection with the intake of said motor, valves in said flow connections operable to open or close either exclusively of the other, branches from the return conduit to the heater and cooler respectively, valves in said branches operable to open or close either exclusively of the other, a circulating pump interposed between the return conduit and said branches, a reversing valve between the first named valve and the said intake and return conduits, a blower driven by said motor for circulating air in heat transferring contact with the radiator, and a thermostat exposed to the temperature of the circulating air for shifting the internal switching means of the first named valve.

11. An air conditioning apparatus comprising a fluid heater, a radiator, a fluid motor, a valve having a single inlet and two outlets and selective means for causing different proportions of the fluid entering the inlet to pass to the respective outlets, flow connections in series from the heater to the intake of the fluid motor, from the exhaust of the fluid motor to the inlet of the valve, and from one of the outlets of the valve to the intake of the radiator, a return conduit from the outlet of the radiator to the intake of the heater in flow connection with the other outlet of the valve, an air circulating fan driven by said motor arranged to cause flow of air across the radiator, and means for supplying water in proximity to the radiator for humidifying such air.

12. An air conditioning apparatus comprising a fluid heater, a radiator, a fluid motor, a valve having a single inlet and two outlets with means for causing different proportions of the fluid entering the inlet to pass to the respective outlets, flow connections in series from the heater to the intake of the fluid motor, from the exhaust of the fluid motor to the inlet of the valve and from one of the outlets of the valve to the intake of the radiator, return connections from the other outlet of the valve and from the outlet of the radiator to the intake of the heater, an air circulating fan driven by said motor arranged to cause flow of air across the radiator, an evaporating pan adjacent to the radiator, and means for maintaining and replenishing a supply of water in said pan.

13. An air conditioning apparatus comprising a fluid heater, a radiator, a fluid motor, a valve having a single inlet and two outlets with means for causing different proportions of the fluid entering the inlet to pass to the respective outlets, flow connections in series from the heater to the intake of the fluid motor, from the exhaust of the fluid motor to the inlet of the valve and from one of the outlets of the valve to the intake of the radiator, return connections from the other outlet of the valve and from the outlet of the radiator to the intake of the heater, an air circulating fan driven by said motor arranged to cause flow of air across the radiator, and means for releasing water from the system in proximity to the radiator for humidifying the air.

14. In an air conditioning system, a heat interchanger and a radiator in fluid circulating connection with one another, a fan for causing flow of air in contact with the radiator, means for utilizing the circulating fluid to drive said fan, and controllable means for by-passing a selected part of the circulating fluid past the radiator without altering the amount of the fluid utilized for driving the fan.

15. An air conditioning apparatus comprising a heat interchanger, a radiator, a fluid motor in flow receiving connection with said heat interchanger, a valve casing having a single inlet, two outlets, and an internal partition providing separate passages open to the inlet and leading respectively to the different outlets, said valve casing inlet being connected with the fluid motor to receive fluid discharged from the motor, a switch blade pivoted in said valve casing adjacent to said partition and extending thence toward the inlet and being movable across said passages so as to connect either passage exclusively with the inlet or both passages in varying measures with the inlet at the same time, a connection between one of said outlets and the intake of the radiator, and a connection between the other outlet and the heat exchanger.

16. An air conditioning apparatus comprising a heat interchanger, a radiator, a fluid motor in flow receiving connection with said heat interchanger, a valve casing having a single inlet, two outlets, and an internal partition providing separate passages open to the inlet and leading respectively to the different outlets, said valve casing inlet being connected with the fluid motor to receive fluid discharged from the motor, a switch blade pivoted in said valve casing adjacent to said partition and extending thence toward the inlet and being movable across said passages so as to connect either passage exclusively with the inlet or both passages in varying measures with the inlet at the same time, a connection between one of said outlets and the intake of the radiator, and return connections from the radiator to the heat interchanger with which the other of said valve casing outlets is connected.

17. An air conditioning apparatus as set forth in claim 16 and comprising further a reversing valve interposed between the outlets of said valve casing and the radiator intake and return connection respectively, said valve being reversible to connect either outlet exclusively with the radiator intake and the other exclusively with the return connection.

18. An air conditioning system comprising a radiator, a blower associated with said radiator in a location to cause flow of air across the radiator in thermal contact therewith, a fluid operated motor coupled with said blower for driving the same, a heat interchanger, supply and return connections between the heat interchanger and radiator, said motor being connected in said flow connection to receive fluid from the heat interchanger and deliver fluid to the radiator, means for bypassing fluid discharged from the motor to the heat interchanger without flowing through the radiator, said bypassing means being adjustable to vary and regulate the proportional amounts of fluid passed from the motor to the radiator and bypassed to the interchanger respectively, and thermally controlled means for regulating said bypassing means.

19. An air conditioning apparatus comprising a heat interchanger and a radiator, both of which are adapted to receive and discharge water and to permit transfer of heat between circulating water contained in them and a contiguous medium at different temperature than that of the water, a motor adapted to be driven by water in motion, a blower coupled with said motor to be driven thereby and arranged to cause flow of air across the radiator in thermal contact therewith, a water conducting connection between the heat interchanger and radiator, a water conducting connection between the heat interchanger and the motor, a water conducting connection between the motor and radiator, and valve means in one of said connections adjustable to cause a fraction of the water circulating through the motor and heat interchanger to by-pass the radiator while the remainder of such water passes through the radiator.

ROLAND L. LINCOLN.